United States Patent [19]

Cole et al.

[11] Patent Number: 4,500,206

[45] Date of Patent: Feb. 19, 1985

[54] OPTICAL SYSTEM FOR MEASURING SHADOWGRAPH DATA

[75] Inventors: Eugene O. Cole, Tucson, Ariz.; Vahan H. Yeterian, Lompoc, Calif.

[73] Assignee: The United States of America as represented by the Secretary of the Air Force, Washington, D.C.

[21] Appl. No.: 434,671

[22] Filed: Oct. 15, 1982

[51] Int. Cl.³ .............................................. G01B 11/24
[52] U.S. Cl. ..................... 356/376; 33/227; 33/264; 33/286; 356/138
[58] Field of Search ................. 356/138, 376; 33/227, 33/228, 264; 73/148, 147

[56] References Cited

U.S. PATENT DOCUMENTS

| | | | |
|---|---|---|---|
| 3,004,464 | 10/1961 | Leighton et al. | 88/14 |
| 3,614,237 | 10/1971 | Kyle et al. | 356/120 |
| 3,619,065 | 11/1971 | Agnew | 356/120 |
| 3,858,983 | 1/1975 | Foster et al. | 356/163 |
| 3,894,802 | 7/1975 | Higgins | 356/2 |
| 4,070,683 | 1/1978 | Altschuler et al. | 354/77 |
| 4,199,253 | 4/1980 | Ross | 356/5 |
| 4,202,612 | 5/1980 | Di Matteo et al. | 353/28 |
| 4,325,640 | 4/1982 | Dreyfus et al. | 356/376 |

*Primary Examiner*—R. A. Rosenberger
*Assistant Examiner*—Michael F. Vollero
*Attorney, Agent, or Firm*—Donald J. Singer; Jacob N. Erlich

[57] ABSTRACT

An optical system for measuring azimuth and elevation angular data for making a shadowgraph of an object under study. The system includes a pair of scaled assemblies which are secured together perpendicular to each other, with each of the scaled assemblies having degree markings thereon. An object under study, such as a scale model of an aircraft, is positioned within an imaginary sphere formed by the two scaled assemblies. Azimuth and elevation angular measurements are then obtained by the use of laser systems as the model aircraft is rotated within the imaginary sphere of the ring assemblies.

10 Claims, 16 Drawing Figures

OPTICAL SYSTEM FOR MEASURING SHADOWGRAPH DATA

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the measurement of shadowgraph data, and, more particularly, to an optical system for accurately and reliably measuring shadowgraph data.

There are numerous situations, particularly involving aircraft flight patterns, in which it is essential to determine if the optical line of sight (OLS) from a given point on the aircraft such as an antenna to a particular point a distance therefrom such as a receiving station has been obstructed. This determination is necessary in maintaining integrity of communications between such an aircraft or object located on the aircraft and the data receiving or transmitting station. Unfortunately, in most instances, it is only through trial and error that such an obstruction of the optical line of sight can be determined.

There have been numerous attempts made at theoretically establishing this obstructed optical line of sight. One such attempt involves the production of shadowgraphs representative of the obstructed optical line of sight. Unfortunately, the systems required for obtaining shadowgraph data, that is, data which can be utilized in obtaining a plot representative of the optical line of sight obstruction, are either expensive to construct, and/or are unreliable in obtaining such critical data. If, however, accurate shadowgraph data can be measured, appropriate flight adjustments could be made to compensate for this optical line of sight obstruction.

It would therefore be highly desirable to provide a system which would be capable of reliably measuring such shadowgraph data in an economical manner.

SUMMARY OF THE INVENTION

The present invention overcomes the problems encountered in the past with respect to obtaining shadowgraph data by providing an optical system which can be economically and reliably utilized in obtaining the measurement of such shadowgraph data.

The optical system of this invention is made up of a pair of scaled assemblies positioned perpendicular to each other. One of the assemblies is ring-shaped and effective in obtaining angular azimuth information while the other scaled assembly is half-ring-shaped and capable of providing angular elevation information. Appropriate use of these scaled assemblies provides sufficient data to make shadowgraphs representative of how an aircraft's configuration effects the OLS of antennas or missiles carried by the aircraft. It should, however, be realized that although the present invention is used primarily in conjunction with aircraft, it can be utilized in obtaining information with respect to the obstructed line of sight of any object.

Since this invention is primarily used with an aircraft, a model of such an aircraft is secured within the center of a circle formed by the mutually perpendicular intersection of the two scaled ring assemblies. The exact positioning of the model aircraft within the scaled assemblies is obtained by a suitable three axes movable gimballed support assembly and jacks.

A laser alignment system is utilized in conjunction with the two scaled assemblies in order to assist in accurately positioning the model aircraft prior to the measurement procedure. A laser measuring system is then utilized in conjunction with the laser alignment system and the scaled assemblies to obtain the actual optical line of sight shadowgraph data measurements.

It is essential in the construction of the optical system of this invention to secure the scaled assemblies together in such a manner as to form two mutually perpendicular planes. The center of the line formed by the intersection of these two perpendicular planes being the center of an imaginary sphere. With such a design, the model under study can be placed within the center of the circle formed by the two mutually perpendicular scaled assemblies with the antenna or object under study located at the exact center of this imaginary sphere.

Appropriate use of the support assembly for the model in conjunction with the laser alignment system allows for the accurate centering and proper positioning of the model to be made. Once the model has been positioned accurately within the center of the imaginary sphere, shadowgraph measurements can be taken by the laser measuring system by directing a laser beam at the object under study from a variety of positions adjacent the scaled assemblies. For each position along the scaled elevation assembly, it is possible with the optical system of this invention to rotate the aircraft model under study and therefore make accurate azimuth and elevation determinations and data measurements which can be used in producing the appropriate shadowgraph necessary in determining optical line of sight obstruction.

It is therefore an object of this invention to provide an optical system for measuring shadowgraph data in a highly reliable manner.

It is further object of this invention to provide an optical system for measuring shadowgraph data at a minimum of cost.

It is still a further object of this invention to provide an optical system for measuring shadowgraph data which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

DETAILED DESCRIPTION OF THE PREFERRED EMBODIMENT

Figure 1:
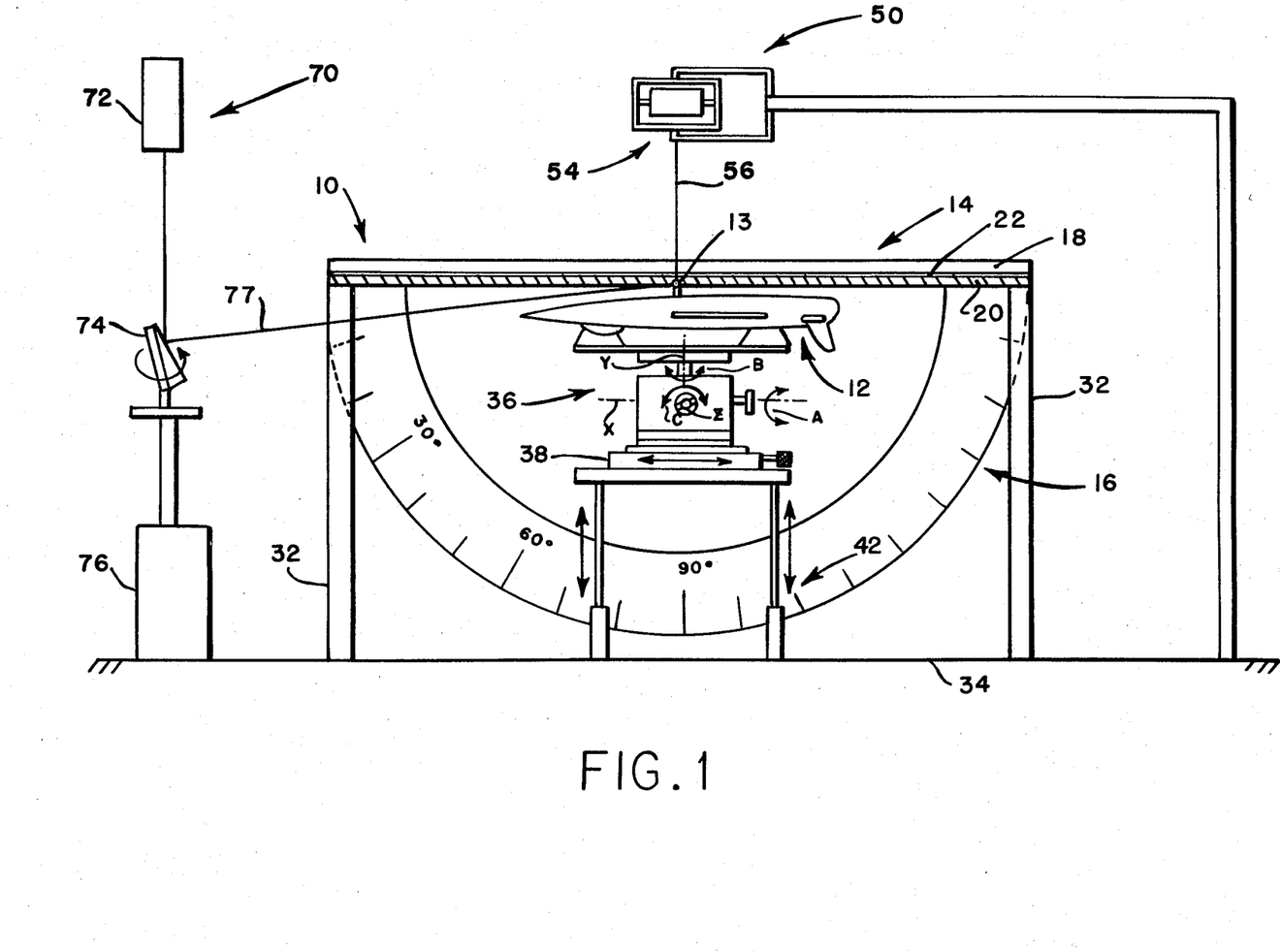
FIG. 1 is a side elevational view, shown partly in schematic fashion, of the optical system for measuring shadowgraph data of this invention.
Figure 2:
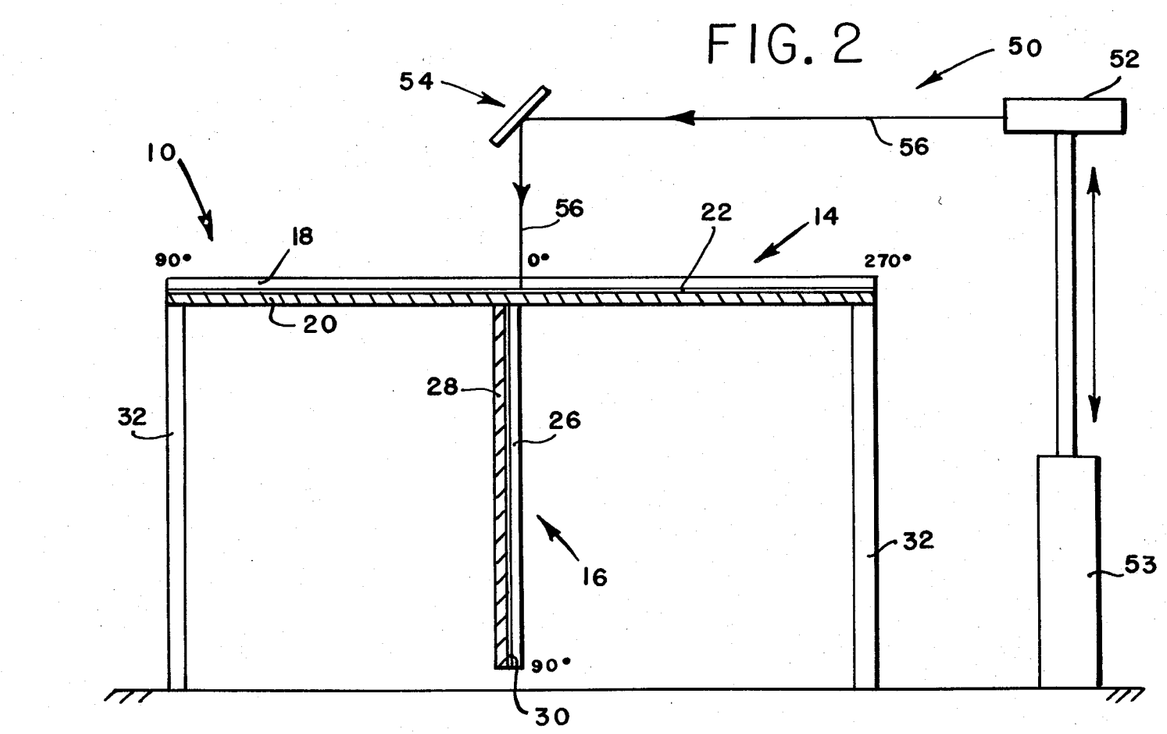
FIG. 2 is an end view, shown in partly schematic fashion, of the optical system for measuring shadowgraph data of this invention also shown partly in cross-section.
Figure 3:
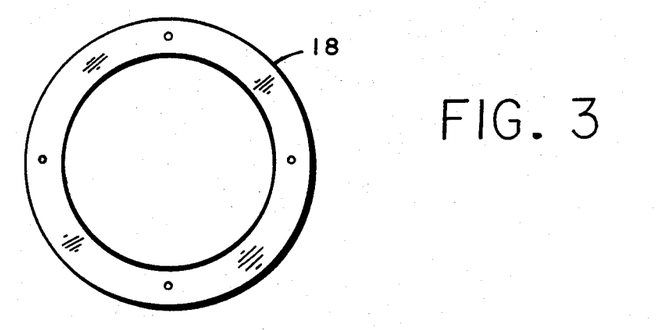
FIGS. 3 through 5 illustrate the various components of the scaled azimuth assembly utilized with the optical system of this invention.
Figure 4:
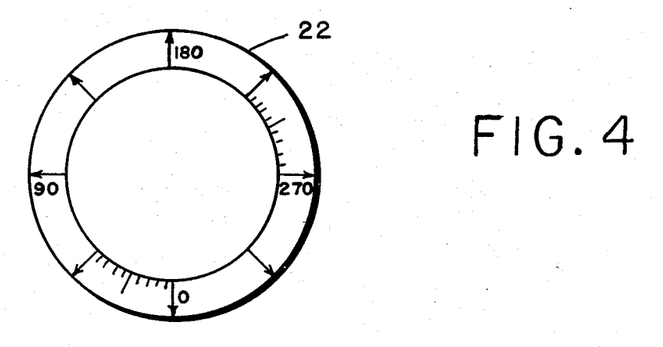
Figure 5:
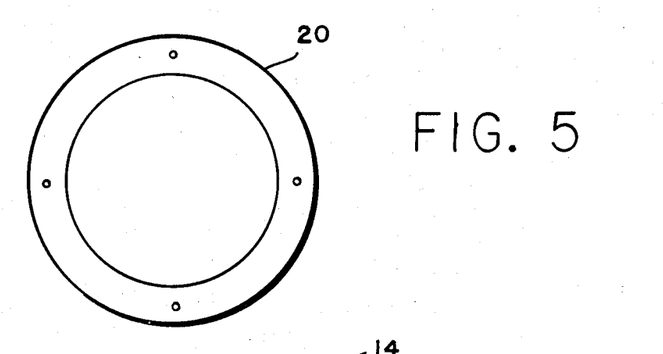
Figure 6:
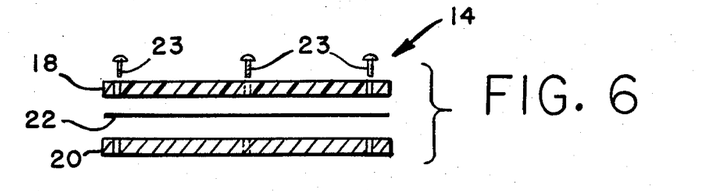
FIG. 6 is a side view, shown partly in cross section, of the components making up the scaled azimuth assembly of the optical system of this invention.
Figure 7:
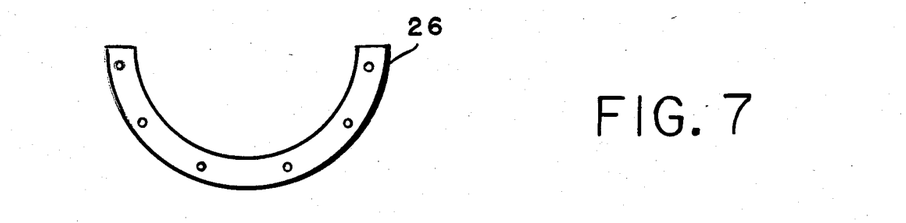
FIGS. 7 through 9 illustrate the components which make up the scaled elevation assembly of the optical system of this invention.
Figure 8:
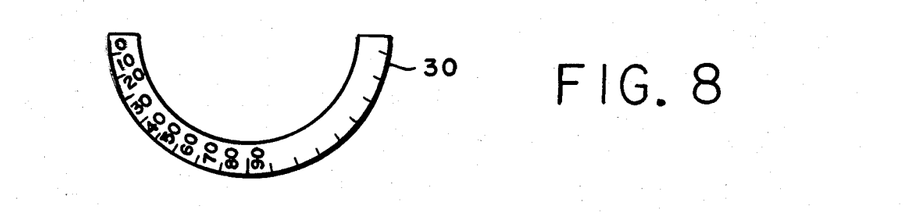
Figure 9:
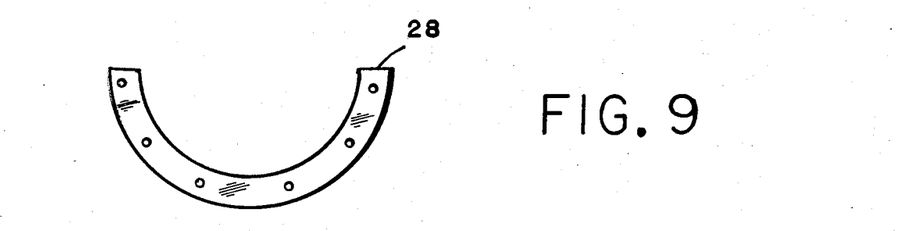
Figure 10:
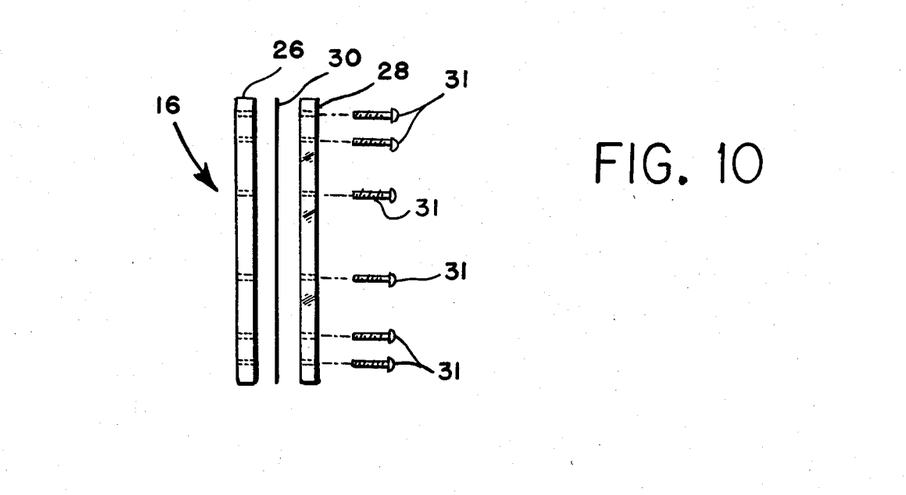
FIG. 10 is a side elevational view, shown partly in cross section, of the components which make up the scaled elevation assembly of the optical system of this invention.
Figure 11:
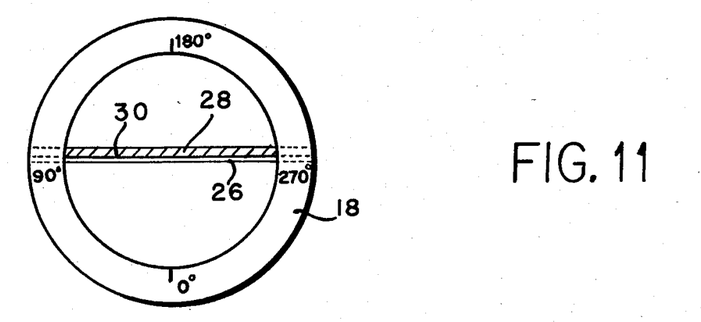
FIG. 11 is a plan view illustrating the pair of optical ring assemblies prior to positioning of a model in place within the optical system for measuring shadowgraph data of this invention.

Reference is now made to FIGS. 1 and 2 of the drawing which clearly illustrate in schematic fashion the optical system 10 of this invention for measuring shadowgraph data. Although the shadowgraph data obtained by the use of the optical system 10 of this invention is primarily for determining obstructed optical line of sight (OLS) for either an antenna or missiles located on an aircraft, it should be realized that this invention can be used for obtaining shadowgraphs of any object having an obstructed optical line of sight problem. However, as stated above since obstructed OLS is primarily an aircraft problem, the following description of this invention will include the use of a scale model aircraft 12, preferably 1/48 scale, in order to simulate an actual aircraft.

As shown in FIGS. 1 and 2 of the drawing, optical system 10 is made up of a pair of scaled assemblies 14 and 16. Scaled assembly 14 is ring-shaped and utilized for angular azimuth determinations while scaled assembly 16 is half-ring-shaped and utilized for angular elevation determinations. In fully describing scaled assemblies 14 and 16, further reference will also be made to FIGS. 3 through 6 which show the components making up the scaled azimuth assembly 14 and FIGS. 7 through 10 which make up the scaled elevation assembly 16.

Scaled azimuth assembly 14 includes a pair of ring-shaped members 18 and 20. Member 18 is made of any suitable rigid transparent material such as plexiglass while the supporting member 20 is made of a rigid material such as aluminum. Located between the two ring-shaped members 18 and 20 is a scaled ring-shaped element 22 divided into degrees from 0 to 360. Scaled element 22 is preferably made of a thin sheet of material, such as Mylar, sandwiched between plexiglass member 18 and aluminum member 20. The components of scaled assembly 14 are secured together by any suitable securing means such as a plurality of screws 23.

The scaled elevation assembly 16 is formed of a half circle configuration as shown in FIGS. 1 and 7 through 9. The scaled elevation assembly 16 is made of a transparent, rigid, half-ring-shaped member 26 and a solid aluminum half-ring-shaped member 28 having sandwiched therebetween a scaled half-ring-shaped element 30 with the scale thereon being from 0 to 180 degrees. The components 26, 28 and 30 are secured together by any conventional securing means such as screws 31.

As shown in FIGS. 1 and 2 of the drawing, it is critical that the scaled azimuth assembly 14 and the scaled elevation assembly 16 be secured together so that the plexiglass surface of the half-ring-shaped member 26 of scaled elevation assembly 16 and the bottom surface of the ring-shaped member 20 of the scaled azimuth assembly 14 form two mutually perpendicular planes (see FIG. 2). The center of the line formed by the intersection of these two perpendicular planes is the center of an imaginary sphere. By designing the optical system 10 of this invention in the manner described above, model 12 when correctly placed within the ring assemblies 14 and 16 in a manner described hereinbelow, will have its point of interest, such as an antenna 13, to be studied for optical line of sight obstruction at the center of the imaginary sphere.

It is essential that the placement of the scaled azimuth and elevation assemblies 14 and 16 be made correctly for proper operation of this invention. By properly positioning the scaled azimuth and elevational assemblies 14 and 16, a spherical coordinate system is formed which permits the azimuth and elevation angle measurements to be made in a manner described hereinbelow. The scaled elevation assembly 16 is designed for angular measurements from 0 to 90 degrees in one degree increments with the zero degree marking beginning at the point at which the scaled elevation assembly 16 meets the scaled azimuth assembly 14. The scaled assemblies 14 and 16 are fixedly secured together by any suitable securing means such as bolts (not shown). Any suitable frame made up of a plurality of legs 32 which rest upon a suitable immobile stationary optical bench 34 are utilized to maintain the components of optical system 10 rigid during the shadowgraph data measuring procedure.

Figure 15:
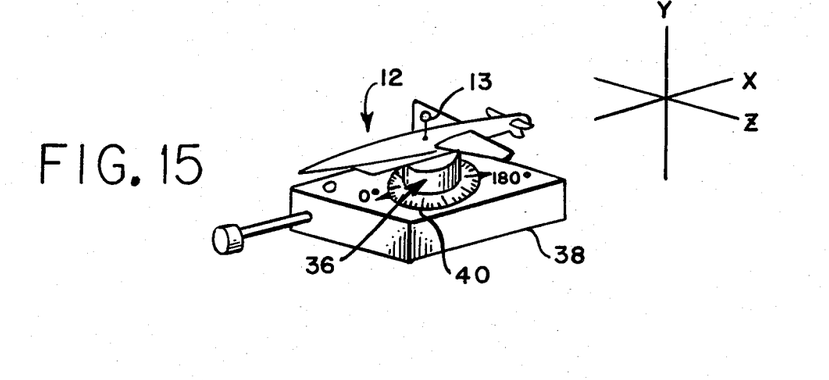
FIG. 15 is a pictorial representation illustrating the rotational mount for supporting the model within the gimballed support assembly of the optical system of this invention.

The model 12 under study is positioned centrally within the scaled assemblies 14 and 16 by any suitable gimballed support assembly 36. An example of such a support assembly 36 is illustrated in FIGS. 1 and 15 of the drawing. Any suitable support assembly 36 can be utilized with this invention as long as model 12, under study, can be moved about three independent axes, that is, in the direction of arrow A about the X axis, arrow B about the Y axis and arrow C about the Z axis. In addition, gimballed support assembly 36 is secured upon a linearly movable support 38 which is capable of providing movement along the X and Z axes.

Still further, as shown in FIG. 15 a rotational mount 40 is situated within transverse support 38 so as to rotate the model 12 about the vertical Y axis for a full 360 degrees when making the shadowgraph measurements with respect to the azimuth and elevation angles. Also, the entire mounting arrangement (including gimballed support assembly 36, transverse support 38 and rotational mount 40) is situated on a support structure 42 which allows vertical movement of model 12 to take place. Such an arrangement provides multiple movement capability for model 12 during the alignment procedure and during the shadowgraph measurement procedure.

Figure 12:
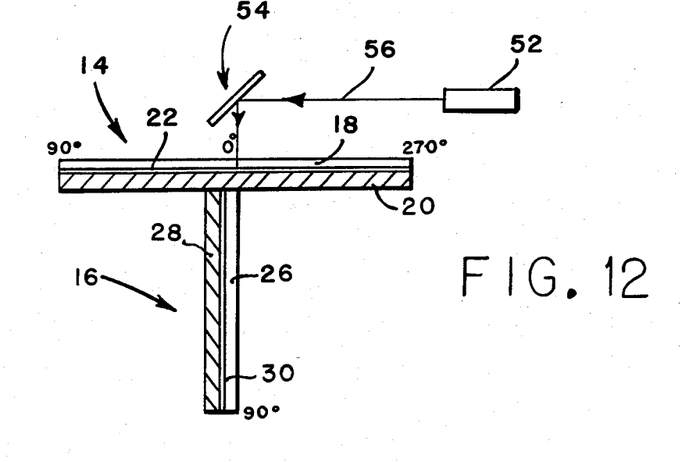
FIG. 12 is a schematic illustration of an alignment procedure using the laser alignment system of the optical system of this invention and shown partly in cross section.

As shown in FIGS. 1 and 2 of the drawing, a laser alignment system 50 is provided in order to assist on properly aligning the object or model 12 within the optical system 10 of this system. Laser alignment system 50 is made up of a vertically movable conventional laser 52 (see FIG. 2) such as as Hughes Corp. Model 322H-PC laser and a gimballed mirror assembly 54. In this manner a beam 56 emanating from laser 52 and directed onto mirror assembly 54 can be directed straight down upon the scaled azimuth assembly 14. When correctly positioned, beam 56 emanating from laser 52 intersects the center of the imaginary sphere and just grazes the 90 degree mark on the scaled elevation assembly 16, as shown in FIG. 12. When this occurs, beam 56 is also perpendicular to scaled azimuth assembly 14. Beam 56 now forms a reference for aligning the optical equipment and positioning model 12 within the pair of scaled assemblies 14 and 16.

When properly positioned, the point under study such as antenna 13 of model 12 will remain illuminated by the beam 56 as model 12 is rotated 360 degrees by rotatable mount 40 illustrated in FIG. 15. The alignment laser system 50 stays in place throughout the shadowgraph measurement procedure to insure correct position of model 12 and maintain the accuracy of data collected.

Figure 13:
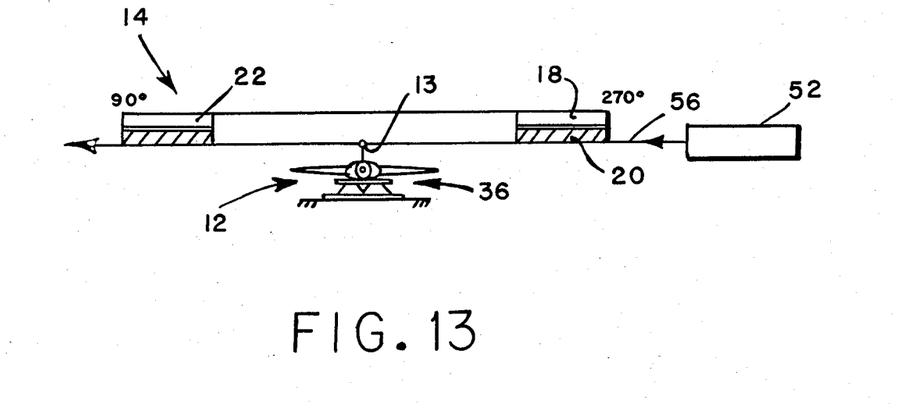
FIG. 13 is a schematic illustration showing the positioning of a model within the scaled azimuth assembly of the optical system for measuring shadowgraph data of this invention and shown partly in cross-section.
Figure 14:
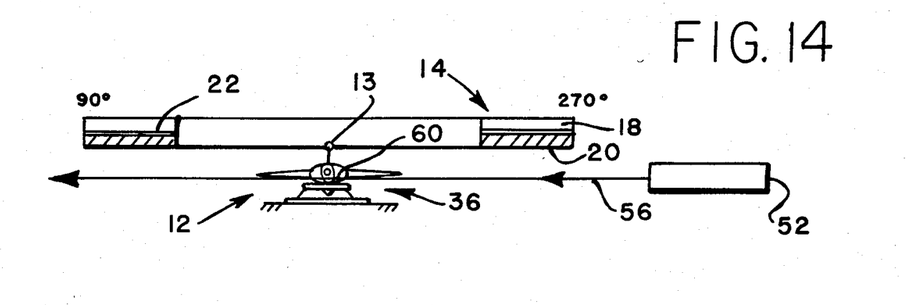
FIG. 14 is a schematic illustration of another alignment procedure for the model being used with the optical system for measuring shadowgraph data of this invention.

Further alignment of model 12 will be described with reference to FIGS. 11-14 of the drawing. As pointed out above, the first alignment insures that beam 56 directly shines on the object under study, such as antenna 13 of model 12. Once established laser 52 is lowered vertically into laser fixture 53 as illustrated in FIGS. 2 and 13 so that beam 56 will be directly received by the top of antenna 13 under study. In order to maintain this position, model 12 is either raised or lowered accordingly. Once this position has been established, laser 52 is lowered to the position shown in FIG. 14 and in that position, laser beam 56 must pass directly through a water line mark 60 on model 12. This line is used to insure that model 12 is level about its pitch and roll axes when it is rotated 360 degrees about its yaw axis. All movement of model 12 can be made by the appropriate adjustments of gimballed support assembly 36, mount 38 and support 42.

Figure 16:
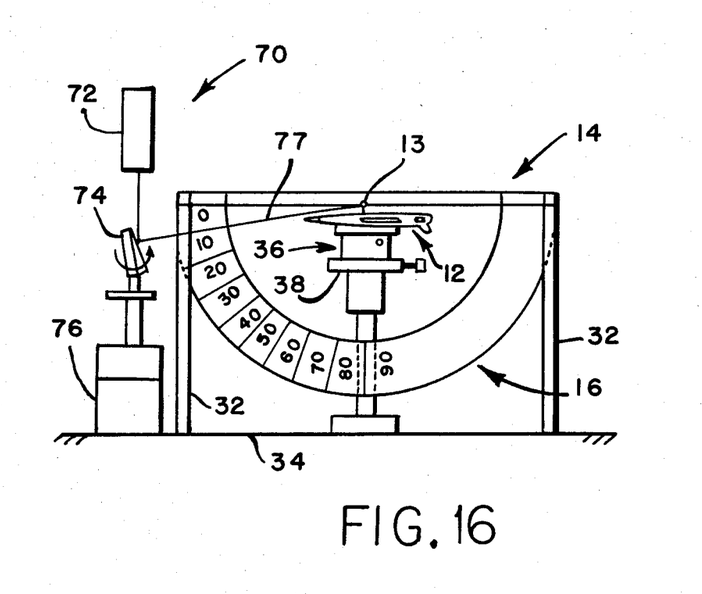
FIG. 16 is a schematic illustration of a shadowgraph data measurement being made with the optical system for measuring shadowgraph data of this invention.

Once in its appropriate position, the shadowgraph measuring laser system 70 becomes effective in providing shadowgraph data. Laser system 70 is made up of any conventional laser 72 of the type described above with respect to laser 52, and a rotatable reflecting mirror 74 which is movable in the vertical direction on support 76. When model 12 is properly positioned within the scaled assemblies 14 and 16, the elevation degree values can be read off scaled elevation assembly 16 as mirror 74 is lowered to a variety of positions such as shown in FIG. 16 of the drawing. During actual shadowgraph measurements the readings are taken from the scaled elevation assembly 16 and correlated to a variety of azimuth positions on azimuth assembly 14 as the model 12 is rotated through 360 degrees on the azimuth scale. Elevational readings are read in increments from 0°-90° along the scaled elevation assembly 16.

Detection of laser beam 77 upon antenna 13 under observation can be made either visually or by a photocell which is located within antenna 13 on model 12. Any obstruction of antenna 13 by the body of the aircraft model 12 will prevent antenna 13 from being illuminated and therefore have its optical line of sight obstructed. These shadowgraph measurements can be utilized to make an accurate determination of aircraft position so as to eliminate line of sight obstruction during actual aircraft flight.

As stated above, although the primary use of the present invention is with optical line of sight obstruction in aircraft, any objects having problems such as those described above may be either placed directly within the optical system 10 of this invention or a model thereof may be used with the optical system 10 of this invention in order to provide azimuth and elevation data. Furthermore, although this invention has been described with reference to a particular embodiment, it will be understood that this invention is also capable of further and other embodiments within the spirit and scope of the appended claims.

The following is claimed.

We claim:

1. An optical system for measuring shadowgraph data from an object under study comprising:
    first means fixedly secured to a stationary surface for providing angular markings from 0 to 360 degrees;
    second means fixedly secured to said first means and situated perpendicular thereto for providing angular markings from 0 to 90 degrees;
    said first and second angular marking means being joined together in order to form an imaginary spherical configuration in which said object under study can be positioned;
    means for positioning said object under study within said imaginary spherical configuration, said object positioning means providing movement of said object under study about three independent axes as well as linear movement along said three axes;
    means for aligning said object under study with respect to said first and second angular marking means;
    means for providing a beam of electromagnetic radiation adjacent said second angular marking means and for illuminating preselected angular markings on said second means; and
    means operably associated with said object positioning means for rotating said object about an axis passing through the center of and perpendicular to said first angular marking means;
    whereby upon rotation of said object under study about said axis passing through said first angular marking means, shadowgraph data angular measurements are obtained as said electromagnetic beam intersects said angular markings of said second means and said object under study.

2. An optical system for measuring shadowgraph data as defined in claim 1 wherein said means for aligning said object under study comprises means for providing a beam of electromagnetic radiation and means optically aligned therewith for directing said aligning beam of electromagnetic radiation along said axis passing through the center of said first angular marking means.

3. An optical system for measuring shadowgraph data as defined in claim 2 wherein said means for aligning said object under study further comprises means for moving said aligning beam producing means to a number of positions adjacent said object under study.

4. An optical system for measuring shadowgraph data as defined in claim 3 wherein said means for providing said beam of electromagnetic radiation adjacent said second angular marking means comprises a laser, adjustable means for directing said beam of electromagnetic radiation produced by said laser to said second angular marking means and said object, and means for movably mounting said adjustable directing means.

5. An optical system for measuring shadowgraph data as defined in claim 4 wherein said first angular marking means comprises a ring-shaped assembly having said angular markings thereon.

6. An optical system for measuring shadowgraph data as defined in claim 5 wherein said second angular marking means comprises a half-ring-shaped assembly having said angular markings thereon.

7. An optical system for measuring shadowgraph data as defined in claim 6 wherein each of said assemblies of said first and said second angular markings means comprises a non-transparent rigid member, a transparent rigid member and a scaled thin sheet of material sandwiched therebetween.

8. An optical system for measuring shadowgraph data as defined in claim 7 wherein said scaled ring-shaped assembly and said scaled half-ring-shaped assembly are secured together such that a surface of said transparent member of said half-ring-shaped assembly and a surface of said non-transparent rigid member of said ring-shaped assembly form two mutually perpendicular planes.

9. An optical system for measuring shadowgraph data as defined in claim 8 wherein the intersection of said two perpendicular planes is the center of said imaginary sphere.

10. An optical system for measuring shadowgraph data as defined in claim 9 wherein said object under study comprises a model of an aircraft.

* * * * *